March 10, 1970    P. DURAND    3,499,258
ASSEMBLED STEEL STRUCTURE SECTIONS
Filed Nov. 8, 1966 ly # United States Patent Office 3,499,258
Patented Mar. 10, 1970

3,499,258
ASSEMBLED STEEL STRUCTURE SECTIONS
Pierre Durand, Lyon, France, assignor to Richier, Paris, France, a French company
Filed Nov. 8, 1966, Ser. No. 592,907
Int. Cl. E04h *12/08;* B23p *19/04;* B23q *3/18*
U.S. Cl. 52—637                                  4 Claims

ABSTRACT OF THE DISCLOSURE

Tower crane sections are connected and centered oy means of removable cylindrical drift pins passing through aligned calibrated holes in fittings of the tower sections while bolts pass with play through oversize holes which are approximately aligned in the fittings.

---

The present invention relates to improvements in the assembling of steel structure sections.

Steel structure towers or masts are usually formed by superposing sections made of members connected by diagonal braces. This method is more particularly used for tower cranes which have to be frequently erected and dismounted on the spot.

On erection, the sections are interconnected either by means of fishplates 2 bolted at the ends of the members, as shown in FIGURE 1 of the appended diagrammatic drawing, or by means of bolts 3 which are in tension and butt joint the members through fittings 4 solid with said members, as shown in FIGURE 2 of said drawing.

Said assemblies should allow transmitting the longitudinal stresses A which are exerted in the members, and the transverse stresses B transmitted by the diagonal braces and resulting from shear stresses or torsional moments.

It is absolutely necessary that such assemblies have no play, so as to obtain a correct transmission of said stresses. The builder must either use bolts which are themselves mounted without any play, or increase the number of said bolts in a manner such as to ensure the connections through the adhesion of the contacting surfaces.

In the first case, the bolt holes must be drilled very accurately, and during the erection and dismounting operations, which are very frequent as far as tower cranes are concerned, the positioning of said accurately fitted bolts is all the more difficult as the structure sections are heavy and it is difficult to bring them into suitable positions.

In the second case, it is not always possible to use a great number of bolts which, besides, is seldom consistent with maximum material saving. Moreover, such a great number of bolts always results in a substantial increase in the time required for assembly.

The object of the present invention is to obviate such drawbacks. To this end, the invention relates to an improvement in the connection of steel structure sections, and namely in the connection of tower crane sections. According to the invention, the centering of the fittings solid with the members of the sections is obtained by means of removable cylindrical drift pins each passing through a calibrated hole in the upper fitting of the lower member of a pair of members and through a similar hole in the lower fitting of the upper member of said pair of members, said fittings being assembled by means of bolts.

The invention will be clearly understood from the following description, with reference to the appended diagrammatic drawing which illustrates, by way of nonlimiting example, an embodiment of said improved assembling of tower crane sections. In said drawing.

Figure 1:
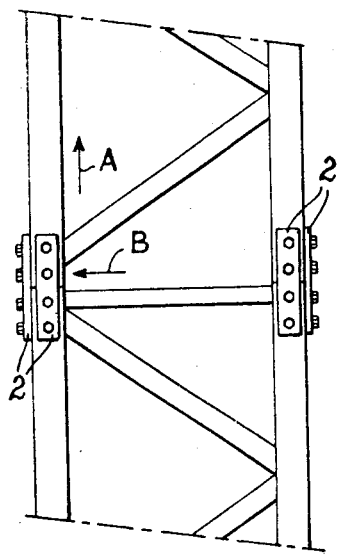
FIGURES 1 and 2 are a front view and a partly sectional view, respectively, showing the two conventional assembling means mentioned hereinabove.
Figure 3:
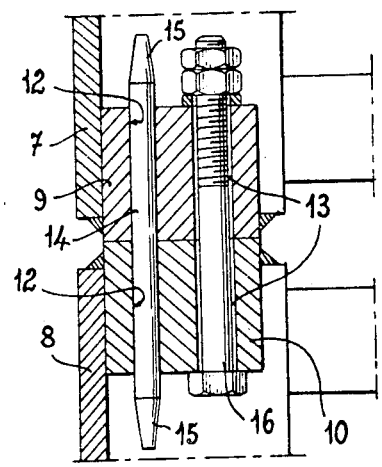
FIGURES 3 and 4 are sectional views, lengthwise and from above respectively, showing the assembling according to the invention.
Figure 2:
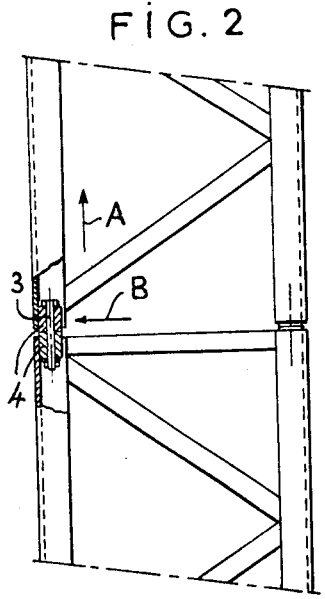
Figure 4:
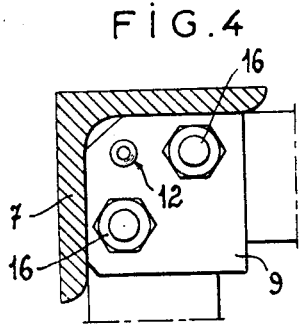

In said drawing, 7 and 8 indicate two of the members of the sections to be assembled.

Fittings 9 and 10 are welded to the members 7 and 8 and each is provided with a calibrated hole 12 and two plain holes 13.

On erection, the two fittings are positioned one over the other, and a drift pin 14 with conical ends 15 is drive into the calibrated hole 12 of the fitting 9 and then into hole 12 of the fitting 10, this latter hole 12 being coaxial to the first hole 12; two bolts 16 are then fitted into the plain holes 13 with a certain amount of lateral play.

The drift pin 14 accurately fitted into the calibrated holes 12 provides, together with the bolts 16, a suitable assembly adapted to transmit longitudinal and transverse stresses.

In said arrangement, the two fittings are fully identical and, whereas two bolts have been provided for each corner or each assembling, this number may be varied depending on the size and shape of the sections.

What I claim is:

1. Apparatus comprising an assembly of a pair of steel structural tower sections, said pair of sections including at least two spaced portions, each portion having a pair of adjoining fittings each rigid with a respective section, each fitting being provided with at least two holes only one of which is a calibrated hole, said fittings being positioned so that the calibrated holes are in exact axial alignment while the other holes are substantially aligned, a removable cylindrical drift pin accurately fitted in the aligned calibrated holes and a bolt in each of the other aligned holes, the latter aligned holes being slightly oversized to receive the associated bolt with slight play.

2. Apparatus as claimed in claim 1 wherein said tower sections are located one above the other, with the drift pin and bolt vertical.

3. Apparatus as claimed in claim 2 wherein at least two bolts are provided which flank the drift pin.

4. Apparatus as claimed in claim 3 wherein said drift pin includes tapered end portions and is insertable from either end into the aligned holes in the fittings.

References Cited

UNITED STATES PATENTS

| 1,626,393 | 4/1927 | Cater | 52—638 |
|---|---|---|---|
| 1,840,169 | 1/1932 | Nash. | |
| 1,859,894 | 5/1932 | Schiller | 52—645 X |
| 1,896,530 | 2/1933 | Trout. | |
| 2,293,399 | 8/1942 | Moecker et al. | |
| 2,920,682 | 1/1960 | Lindberg. | |
| 3,261,086 | 7/1966 | Dunn | 29—468 X |

CHARLIE T. MOON, Primary Examiner

U.S. Cl. X.R.

29—155, 464, 526; 287—189.36